(12) United States Patent
Grave

(10) Patent No.: US 10,894,504 B2
(45) Date of Patent: Jan. 19, 2021

(54) ILLUMINANT FOR VEHICLE HEADLIGHT WITH AUTOMATIC BEAM MODE SELECTION

(71) Applicant: LUMILEDS LLC, San Jose, CA (US)

(72) Inventor: Manuel Grave, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/220,945

(22) Filed: Dec. 14, 2018

(65) Prior Publication Data
US 2019/0184891 A1    Jun. 20, 2019

(30) Foreign Application Priority Data
Dec. 14, 2017   (EP) ..................................... 17207320

(51) Int. Cl.
| | |
|---|---|
| *B60Q 1/00* | (2006.01) |
| *F21K 9/23* | (2016.01) |
| *F21S 41/19* | (2018.01) |
| *F21S 41/141* | (2018.01) |
| *F21S 41/32* | (2018.01) |

(Continued)

(52) U.S. Cl.
CPC ......... *B60Q 1/1423* (2013.01); *B60Q 1/0023* (2013.01); *F21K 9/23* (2016.08); *F21S 41/141* (2018.01); *F21S 41/192* (2018.01); *F21S 41/321* (2018.01); *F21S 41/40* (2018.01); *B60Q 2300/312* (2013.01); *B60Q 2300/314* (2013.01);

(Continued)

(58) Field of Classification Search
CPC ................ B60Q 1/0023; B60Q 1/1423; B60Q 2300/312; B60Q 2300/314; B60Q 2300/41; B60Q 2300/42; F21K 9/23; F21S 41/141; F21S 41/192; F21S 41/321; F21S 41/40; F21Y 2115/10
See application file for complete search history.

(56) References Cited

U.S. PATENT DOCUMENTS

| | | | |
|---|---|---|---|
| 7,510,310 B2 * | 3/2009 | Komatsu ................ | B60Q 1/085 362/466 |
| 8,465,184 B2 | 6/2013 | Hue et al. | |

(Continued)

FOREIGN PATENT DOCUMENTS

| | | |
|---|---|---|
| DE | 102009000289 A1 | 8/2009 |
| DE | 102008032345 A1 | 1/2010 |

(Continued)

*Primary Examiner* — Tsion Tumebo
(74) *Attorney, Agent, or Firm* — Volpe Koenig

(57) ABSTRACT

The invention describes an illuminant for a vehicle headlight comprising a carrier and an electrical driver. Mounted on the carrier are a high-beam LED, a low-beam LED and a vehicle light detector. Additionally, a mechanical interface is included for mounting the illuminant in a corresponding socket of the vehicle headlight in a detachable way, and an electrical connector for supplying electrical power to the electrical driver. The electrical driver is arranged to receive vehicle light detection signals from the vehicle light detector to determine vehicle light by means of the vehicle light detection signals, and to provide a drive current to the high-beam LED or the low-beam LED depending on the determined vehicle light. Illuminant is further arranged to detect ambient light other than the vehicle light, such detection of ambient light influencing electrical driver in controlling the LEDs.

18 Claims, 7 Drawing Sheets

(51) Int. Cl.
*F21S 41/40* (2018.01)
*F21Y 115/10* (2016.01)
*B60Q 1/14* (2006.01)

(52) U.S. Cl.
CPC ...... *B60Q 2300/41* (2013.01); *B60Q 2300/42* (2013.01); *F21Y 2115/10* (2016.08)

(56) References Cited

U.S. PATENT DOCUMENTS

| | | | |
|---|---|---|---|
| 10,214,137 | B2 | 2/2019 | Tong et al. |
| 2004/0105264 | A1* | 6/2004 | Spero ........................ B60Q 1/04 362/276 |
| 2006/0023461 | A1* | 2/2006 | Knight .................... B60Q 1/076 362/466 |
| 2011/0249460 | A1* | 10/2011 | Kushimoto ............ B60Q 1/085 362/510 |
| 2012/0081902 | A1* | 4/2012 | Tessnow .............. B60Q 1/0058 362/283 |
| 2012/0230046 | A1* | 9/2012 | Rice ...................... F21S 41/147 362/538 |
| 2013/0215635 | A1* | 8/2013 | Boyd, Jr. .............. F21S 41/143 362/518 |
| 2013/0258688 | A1* | 10/2013 | Kalapodas ............. B60Q 1/085 362/465 |
| 2014/0098555 | A1* | 4/2014 | Tessnow .................. B60Q 1/04 362/518 |
| 2015/0142263 | A1* | 5/2015 | Hirai ..................... B60S 1/0844 701/36 |
| 2016/0081171 | A1* | 3/2016 | Ichikawa ............. B60Q 1/0088 315/77 |
| 2016/0305626 | A1* | 10/2016 | Tatara ...................... F21S 41/14 |
| 2016/0341384 | A1* | 11/2016 | Hoshino ................. F21S 45/70 |
| 2017/0267162 | A1 | 9/2017 | Remillard et al. |

FOREIGN PATENT DOCUMENTS

| | | |
|---|---|---|
| EP | 0541491 A1 | 5/1993 |
| KR | 20040099194 A | 11/2004 |
| KR | 20160101380 A | 8/2016 |
| WO | 2016008738 A1 | 1/2016 |

* cited by examiner

ILLUMINANT FOR VEHICLE HEADLIGHT WITH AUTOMATIC BEAM MODE SELECTION

FIELD OF INVENTION

The invention relates to an illuminant for a vehicle headlight with automatic beam mode selection.

BACKGROUND

In today's cars, cameras and image data processing are used to automatically decide if high-beam, low-beam, or daytime running light etc. are to be used. The available solutions are cost intensive. Furthermore, it is not that easily possible to upgrade light systems of older cars.

EP0541491A1 discloses a retrofit set consisting of two adapters, an oncoming light sensor, and a controller which might be integrated with one of the adapters allowing to retrofit an older car with automatic switching between high- and low-beam by inserting the adapters into the current supplies of the headlamps and mounting the sensor at the cover glass or reflector of the headlight and cabling the controller with the adapters and the sensor.

DE102009000289A1 discloses a pulse-width modulated LED daytime running light whose intensity is controlled in dependence on the ambient light level wherein the ambient light level is measured by a photosensitive portion of an LED of the daytime running light.

WO2016008738A1 discloses a retrofit LED automotive headlamp.

SUMMARY

It is an object of the present invention to provide an illuminant for an automotive headlight with automatic beam mode selection.

According to a first aspect an illuminant for a vehicle headlight is provided. The illuminant comprises a carrier. One, two, three, four or more high-beam light emitting diodes (LEDs), one, two, three, four or more low-beam LEDs, and one, two, three, four or more vehicle light detectors are mounted on the carrier. The illuminant comprises an electrical driver, a mechanical interface for mounting the illuminant in a corresponding socket of the vehicle headlight in a detachable way, and an electrical connector for supplying electrical power to the electrical driver. The electrical connector may be any kind of plug contact like a H4 plug contact for conventional automotive headlights. The electrical driver may be integrated in the carrier or the mechanical interface or may be an external device connected by a wire arranged between the mechanical interface and the electrical connector. The electrical driver is arranged to receive vehicle light detection signals from the vehicle light detector(s). The electrical driver is arranged to determine vehicle light emitted, for example, by an approaching or preceding vehicle by means of the vehicle light detection signals. The electrical driver is arranged to provide a drive current to the high-beam LEDs or low-beam LEDs depending on the determined light.

The illuminant is a substitute bulb or illuminant which can be used to replace, for example, conventional H4 or H7 headlight bulbs. The vehicle light detector or detectors may especially be used for high-beam switching in order to avoid glaring approaching or preceding vehicles. Furthermore, self-blinding may be avoided in case of fog.

The high-beam LED or LEDs may be arranged to provide an illumination field. The illumination field defines the area on the road which is illuminated by means of the high-beam during driving the vehicle. The vehicle light detector may be arranged to provide a detection field. The detection field defines a solid angle from which vehicle light emitted by approaching or preceding traffic can be detected. The illumination field and the detection field at least partly overlap.

The driver of a vehicle may control the illuminant by means of a vehicle control system in the following way:

In order to keep the flashlight function of the high-beam operative, the following could be done:

Low-beam powerline from car electric powers low-beam and high-beam of lighting unit comprising the illuminant.

If high-beam powerline of car changes state (normally from 0V to 12V), high-beam LEDs are switched on.

Automatic mode (automatically switching between high-beam and low-beam) is normally always active when low-beam powerline of car is active (normally high 12V). But can be switched on and off be special pulse-sequence, e.g. 3 short high-beam powerline high pulses. So, if the driver presses the high-beam function three times shortly in a sequence, automatic mode changes from ON to OFF or vice versa.

The electrical driver may be arranged to switch off the high-beam LED(s) or low-beam LED(s) for a predefined time interval. The electrical driver may in this case be arranged to receive the vehicle light detection signals detected during the predefined time interval. The LEDs are switched off for a short moment. In this moment no light is emitted by the LEDs. Only light from outside can reach the LEDs and vehicle light detector. Within this pulse-pause, the vehicle light measurement is done. If the measured value is above certain levels, a microcontroller or controller of the electrical driver decides which beam-mode to select and which LEDs to switch on again, or keeping switched off. The measurement may, depending on the pulse pause length, be done 200 times per second. The light-off time is that short and frequent that a human eye cannot recognize the off-cycles. It looks flicker free. The on-time interval in which the LEDs are switched on may follow a regular or irregular, e.g. random, pattern. The irregular pattern may avoid coincidence of switching especially with approaching vehicles. The high-beam LED(s) or low-beam LED(s) may simultaneously be switched off in order to maximize sensitivity of vehicle light detection.

At least one high-beam LED or low-beam LED may be arranged to act as vehicle light detector during the predefined time interval. The LED(s) can be used in a photo diode mode while switched off. It is therefore possible to use the same beam pattern for detection and light emission, resulting in a perfect match of illumination field and detection field. One or more low-beam LED may, for example, be further used in a low-beam mode (high-beam LEDs are switched off) to enable an adaptable daytime running light. Furthermore, one or more separate LEDs arranged on the carrier in an offset position with respect to a focus point of a reflector of the respective headlight may be used for the daytime running light. The other high-beam or low-beam LEDs may in this case be driven in a dimmed mode.

The illuminant may alternatively or in addition comprise at least one vehicle light detector being arranged separate from the high-beam LEDs or low-beam LEDs. LEDs which are arranged to emit white light (e.g. blue LEDs with a corresponding light converter) may not be able to detect red light emitted by a rear light. The separate vehicle light detector(s), e.g. photodiodes, may therefore be used to detect the rear light emitted by a preceding vehicle. The photodiode or photodiodes may alternatively or in addition be arranged to detect white light emitted by a vehicle headlight emitted by an approaching vehicle.

According to the invention, the illuminant is arranged to detect ambient light. The electrical driver is arranged to provide the drive current to the high-beam LED or the low-beam LED depending on the detected ambient light. The vehicle light detector may receive vehicle light and ambient light. The detected ambient light may be used to correct or adapt the signals provided by the vehicle light detector by means of the detected ambient light such that differentiation between ambient light sources and approaching or preceding traffic is improved. The ambient light may, for example, be detected by means of one or more low-beam LEDs during time intervals in which at least the corresponding low-beam LEDs are switched off.

The electrical driver may alternatively or in addition be arranged to detect the ambient light based on a time series of vehicle light detection signals. The vehicle light detection signals may be detected by means of one or more low-beam LEDs or high-beam LEDs when the corresponding LEDs are switched off as discussed above. A number of vehicle light detection signals which are detected in subsequent time intervals may be used to determine an ambient light threshold value. Switching off, for example, the high-beam LEDs may be performed as soon as the vehicle light detector detects one or more vehicle light detection signals above the ambient light threshold value. The basic idea of this approach is that ambient light changes slower than vehicle light. Furthermore, there may be a maximum ambient light threshold value in order to avoid that a preceding vehicle is no longer detected after a certain time interval, which, otherwise, might e.g. happen by increasing the ambient light threshold value step-by-step upon approaching the rear light of a preceding vehicle.

The illuminant may alternatively or in addition comprise an ambient light detector mounted on the carrier. The ambient light detector is arranged such that, on detection of ambient light, the detection of vehicle light is suppressed. Any characteristic which can be used to differentiate between vehicle light and ambient light (direction, spectrum etc.) may be used to minimize detection of vehicle light by means of the separate ambient light detector or detectors (e.g. photodiodes). An exterior surface of the carrier may be arranged to absorb light.

The ambient light detector may, for example, be positioned on the carrier such that reception of vehicle light by means of the ambient light detector is minimized when mounted in the reflector of the vehicle headlight. The position of the ambient light detector or detectors may be such that an ambient light detection field does essentially not overlap with the field from which vehicle light is received. A coating or special surface structure provided on top of the carrier may be used to avoid or at least reduce multiple reflections especially of vehicle light.

The illuminant may alternatively or in addition comprise a vehicle light shield. The vehicle light shield is arranged to suppress detection of vehicle light by means of the ambient light detector when mounted in the reflector of the vehicle headlight. The vehicle light shield may be a kind of shielding which avoids that vehicle light directly impinges on or is reflected by the reflector to the ambient light detector. The vehicle light shield may be arranged to absorb vehicle light in order to avoid multiple reflections and therefore subsequent detection by means of the ambient light detector or detectors.

The illuminant may alternatively or in addition comprise a vehicle light filter. The vehicle light filter is arranged to suppress detection of vehicle light by means of the ambient light detector when mounted in the reflector of the vehicle headlight. The vehicle light filter may be arranged to filter certain wavelength ranges which are specific for headlights or rear lights. Two, three or more of such ambient light detectors with vehicle light filters may be used in order to differentiate between different types of headlights or rear lights.

The illuminant may be arranged to adapt light emission in accordance with light emission of a second illuminant. A vehicle like a car comprises two headlights. There is thus a risk that the first illuminant arranged in the left headlight disturbs a second illuminant arranged in the right headlight and vice versa. The illuminant may therefore be arranged to detect and identify light emitted by an illuminant coupled to the same vehicle. Detection may be provided via the electrical power supply, an extra cable connection between both units, or by means of optical detection. The first illuminant may in this configuration, for example, be arranged to be controlled by the second illuminant. The first illuminant may operate in a slave mode, wherein the second illuminant is operating in a master mode. The operating mode of the first and the second illuminant may be predefined. Alternatively, the first or the second illuminant may take over control or adapt light emission in accordance with light emission of the other illuminant. The electrical driver may, for example, be arranged to provide signals via the electrical connection to the power supply, i.e., use a kind of power line communication. Alternatively or in addition, an optical sensor, e.g. one of the vehicle light detectors, may be used to detect the other illuminant and adapt light emission accordingly.

The "connection" between both units can be used for fog detection. When normally both sides are switched off to detect vehicle light, one side keeps being switched on every x-th cycle, e.g. once in 10.000 cycles. The unit still switched off compares the ambient light value when the other unit is switched on with the last measurement when both units were switched off. If the light difference is above a certain level such is interpreted as fog and the high-beam is switched off for both sides.

These and other aspects of the invention will be apparent from and elucidated with reference to the embodiments described hereinafter.

BRIEF DESCRIPTION OF THE DRAWINGS

The invention will now be described, by way of example, based on embodiments with reference to the accompanying drawings.

In the drawings.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
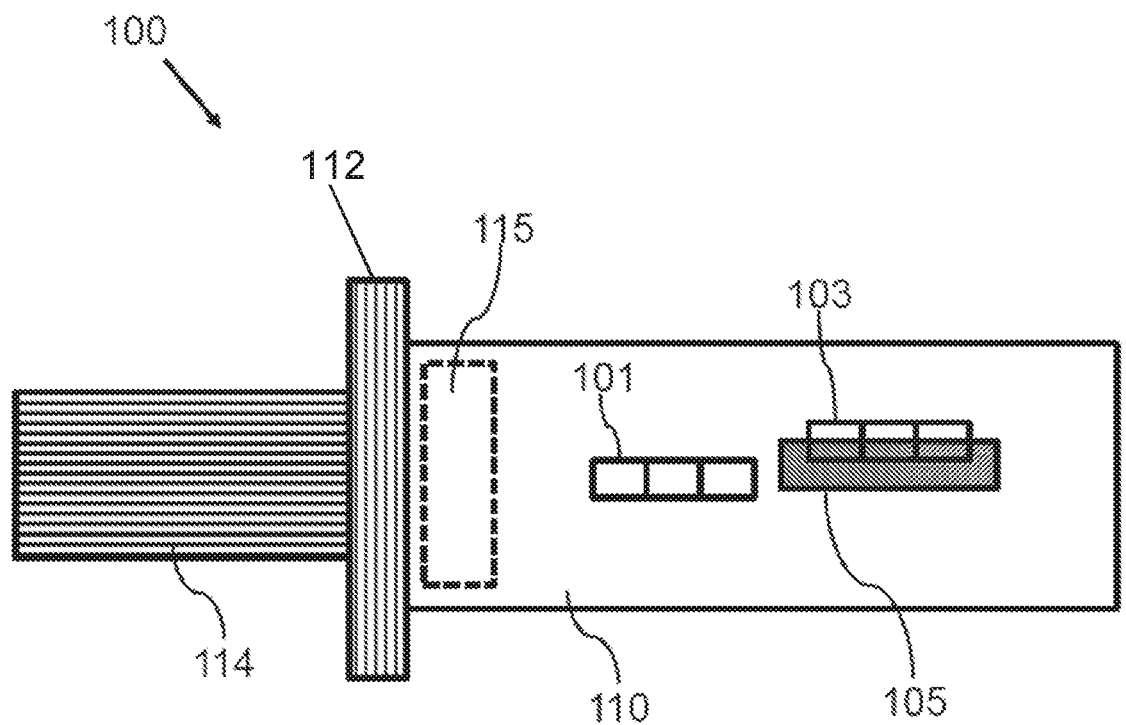
FIG. 1 shows a principal sketch of a first embodiment of an illuminant for a vehicle headlight.

FIG. 1 shows a principal sketch of a first embodiment of an illuminant 100 for a vehicle headlight. The illuminant 100 comprises an electrical connector 114 which is mechanically coupled by means of mechanical interface 112 to a carrier 110. The electrical connector 114 is arranged to be mounted in a corresponding socket and comprises electrical connectors which are arranged to supply electrical power to an electrical driver 115 which is integrated in the carrier 110. Three high-beam LEDs 101 and three low-beam LEDs 103 are mounted on the carrier 110. A low-beam aperture 105 mounted on the carrier 110 is used to define a cutoff for the low-beam. The electrical driver 115 is electrically connected to the high-beam LEDs 101 and low-beam LEDs 103. The electrical driver 115 is arranged to drive the high-beam LEDs 101 and low-beam LEDs 103 in accordance with a corresponding switching scheme. One of the high-beam LEDs 101 is arranged to provide vehicle light detection signals during time intervals in which the high-beam LED 101 is switched off.

Figure 2:
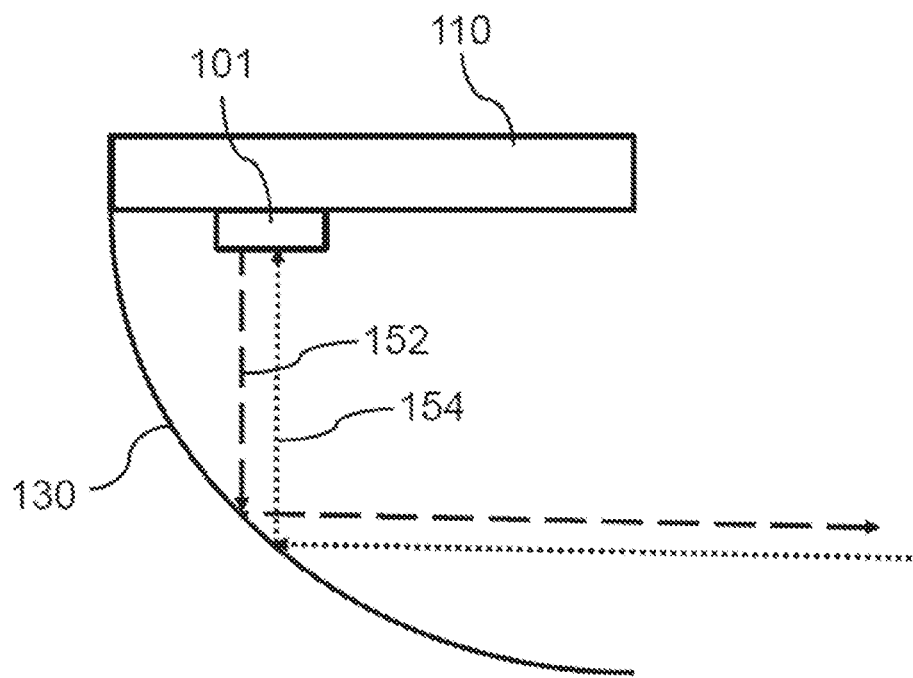
FIG. 2 shows a principal sketch of a cross-section of the relevant part of the first embodiment of the illuminant mounted in a reflector of the headlight.

The principle is shown in FIG. 2 showing a principal sketch of a cross-section of the relevant part of the first embodiment of the illuminant 100 mounted in a reflector 130 of the headlight. The high-beam LED 101 is arranged to emit emitted light 152 in an illumination field in a first time period and to receive vehicle light 154 from a detection field in a second time period. The illumination field and detection field coincide in this embodiment.

Figure 3:
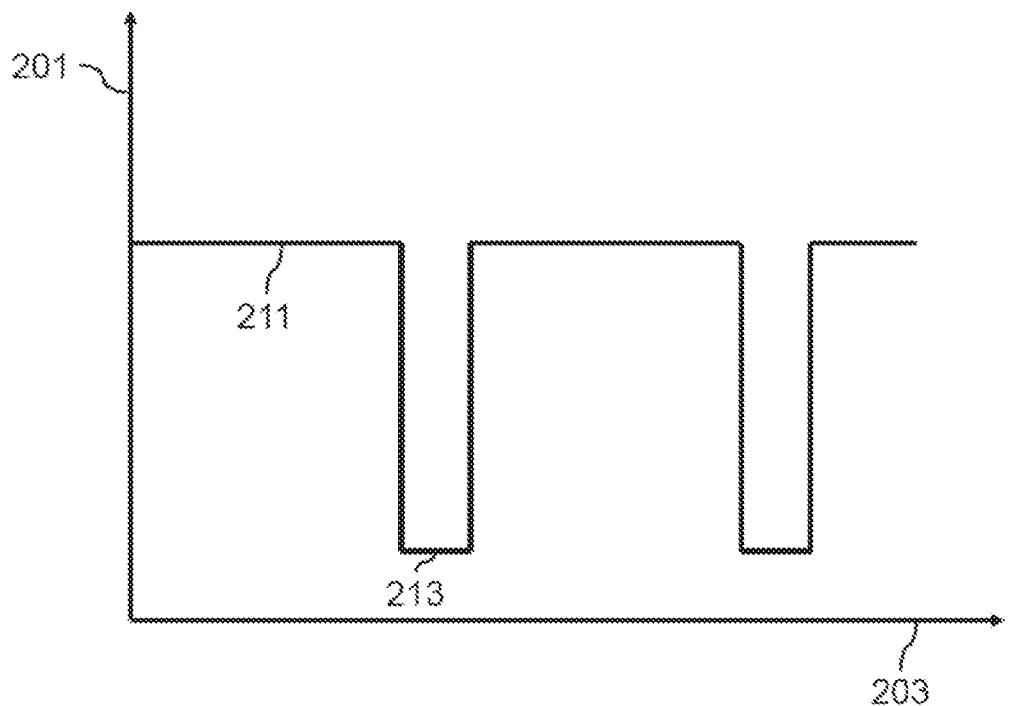
FIG. 3 shows a switching scheme for switching the high-beam LEDs or the low-beam LEDs.

FIG. 3 shows the corresponding switching scheme for switching the high-beam LEDs 101 and low-beam LEDs 103. The x-axis shows the time 203 and the y-axis shows the drive current 201 provided by the electrical driver 115. The high-beam LEDs 101 and the low-beam LEDs 103 are simultaneously switched on at drive current 211 and switched off at drive current 213. The high-beam and low-beam LEDs 101, 103 are periodically switched off with a constant time interval. A first illuminant 100 may be used in the right headlight of a vehicle. The LED 101 of the illuminant 100 of the right headlight which is arranged to provide vehicle light detection signals may be arranged to detect vehicle light emitted by the left headlight of the vehicle. The first illuminant 100 of the right headlight may be arranged to adapt illumination in accordance with the detected light emitted by the left headlight, thus might e.g. synchronize their mutual switching patterns. The first illuminant 100 of the right headlight may be further arranged to provide a signal to a second illuminant 100 of the left headlight indicating that the first illuminant 100 of the right headlight is operating in a slave mode. The second illuminant 100 of the left headlight would in this case automatically operate in a master mode. The signal indicating that the first illuminant 100 of the right headlight is operating in a slave mode may be provided by means of a defined light sequence or an electrical signal which may be submitted via the power line such that the electrical driver 115 of the left headlight can detect the electrical signal. The first illuminant 100 of the right headlight may alternatively provide a signal that the first illuminant 100 of the right headlight is operating in a master mode.

Operation of the illuminant 100 in the master or slave mode may be predefined e.g. in the way that a pair of illuminants 100 consists of a predefined master and a predefined slave, or may be adaptive as described above.

Figure 4:
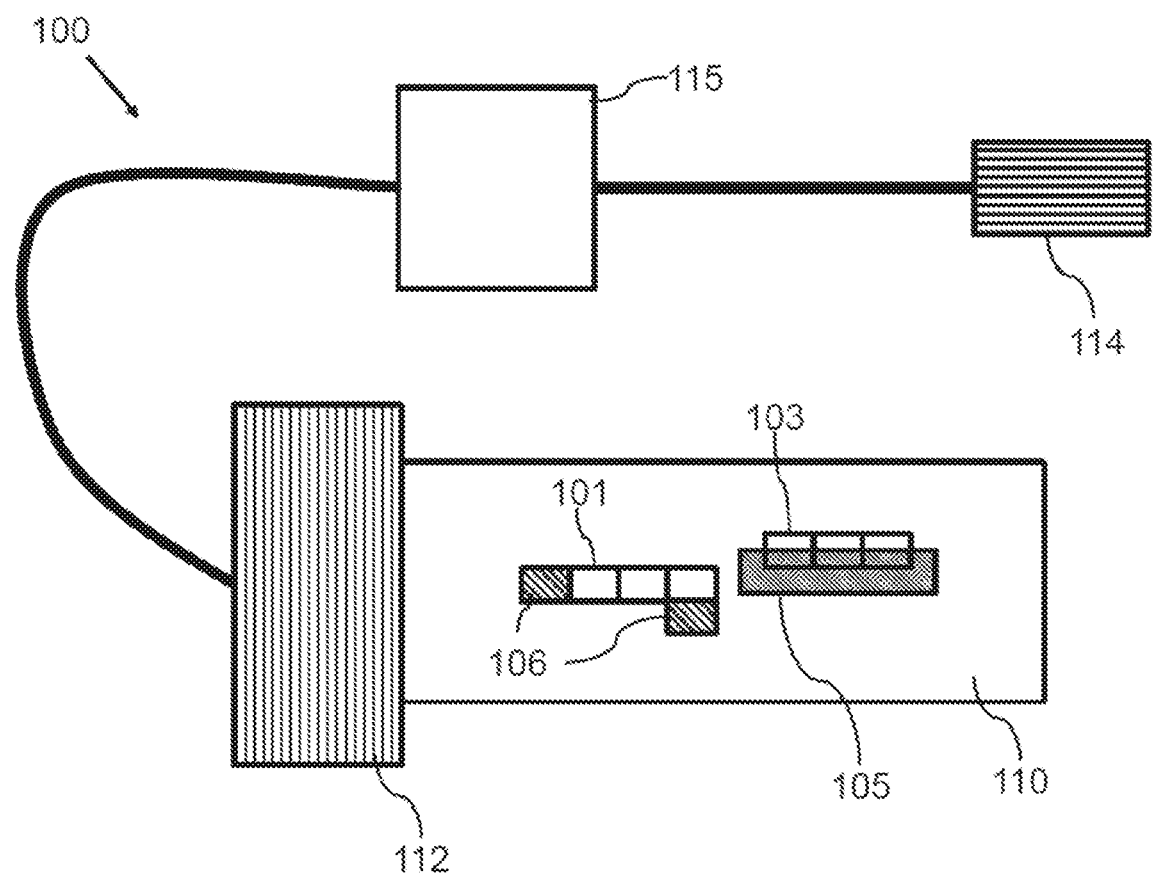
FIG. 4 shows a principal sketch of a second embodiment of an illuminant for a vehicle headlight.

FIG. 4 shows a principal sketch of a second embodiment of an illuminant 100 for a vehicle headlight. The configuration of the illuminant 100 is for illustration purposes similar to the first embodiment discussed with respect to FIG. 1. The illuminant 100 comprises two additional vehicle light detectors 106 which are arranged near to the high-beam LEDs 101 such that the illumination field of the high-beam LEDs 101 and the detection field of the vehicle light detectors 106 overlap. The vehicle light detectors 106 are sensitive in the complete visible wavelength range in order to detect headlights of approaching vehicles and rear lights of preceding vehicles. The electrical driver 115 is in this embodiment an external device which is arranged between the mechanical interface 112 and the electrical connector 114 and connected to both of them with a cable.

The electrical driver 115 is arranged to determine an ambient light threshold based on a time series of subsequent measurements performed by means of the vehicle light detectors 106. The measurements are preferably performed in short time intervals in which the high-beam LEDs 101 and low-beam LEDs 103 are switched off. The switching interval may e.g. be arranged in a random pattern. The electrical driver 115 may be further arranged to limit the ambient light threshold in order to avoid, for example, that the ambient light threshold takes into account light received from a preceding vehicle. The electrical driver 115 may be further arranged to ignore measurement signals provided by the vehicle light detectors 106 changing at a rate beyond a predefined threshold such that measurement signals caused by, for example, an approaching vehicle are ignored with respect to determination of the ambient light threshold. The electrical driver 115 may alternatively or in addition be arranged to ignore measurement signals above a threshold such that measurement signals caused by a rear light or head light are ignored with respect to the determination of the ambient light threshold. Optionally one or more of the high-beam LEDs 101 are used as additional vehicle light detectors. One or more of the low-beam LEDs 103 may optionally be used as ambient light detector in time intervals in which the low-beam LEDs 103 are switched off.

Figure 5:
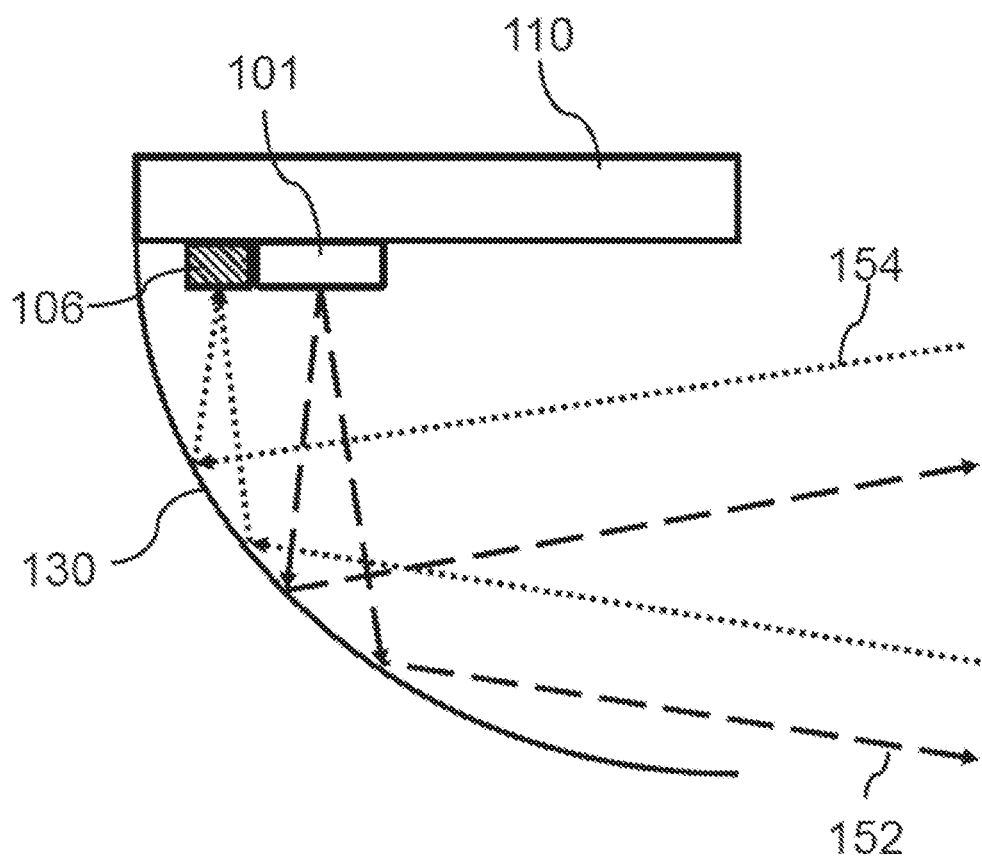
FIG. 5 shows a principal sketch of a cross-section of the relevant part of the second embodiment of the illuminant mounted in a reflector of the headlight.

FIG. 5 shows a principal sketch of a cross-section of the relevant part of the second embodiment of the illuminant 100 mounted in a reflector 130 of a headlight. The detection field of the vehicle light detector 106 overlaps with the illumination field of the high-beam LED 101. This is demonstrated by means of the emitted light 152 emitted by the high-beam LEDs 101 and the vehicle light 154 received by the vehicle light detector 106. FIG. 5 ignores the fact that the high-beam LEDs 101 are preferably switched of during detection of vehicle light 154.

Figure 6:
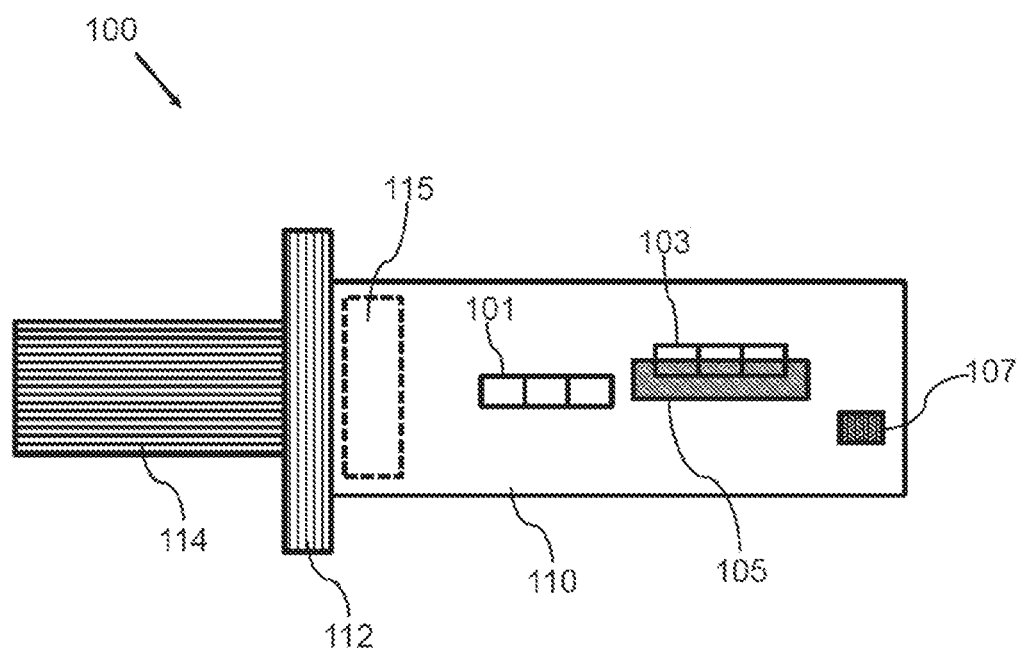
FIG. 6 shows a principal sketch of a third embodiment of an illuminant for a vehicle headlight.

FIG. 6 shows a principal sketch of a third embodiment of an illuminant 100 for a vehicle headlight. The configuration is again very similar as discussed with respect to FIG. 1. One or more of the high-beam LEDs 101 or low-beam LEDs 103 are used as vehicle light detectors as discussed above. An additional ambient light detector 107 is positioned at the end of the carrier 110. The position is selected such that essentially only ambient light 156 is received by the ambient light detector when mounted in a reflector 130 as shown in FIG. 7.

Figure 7:
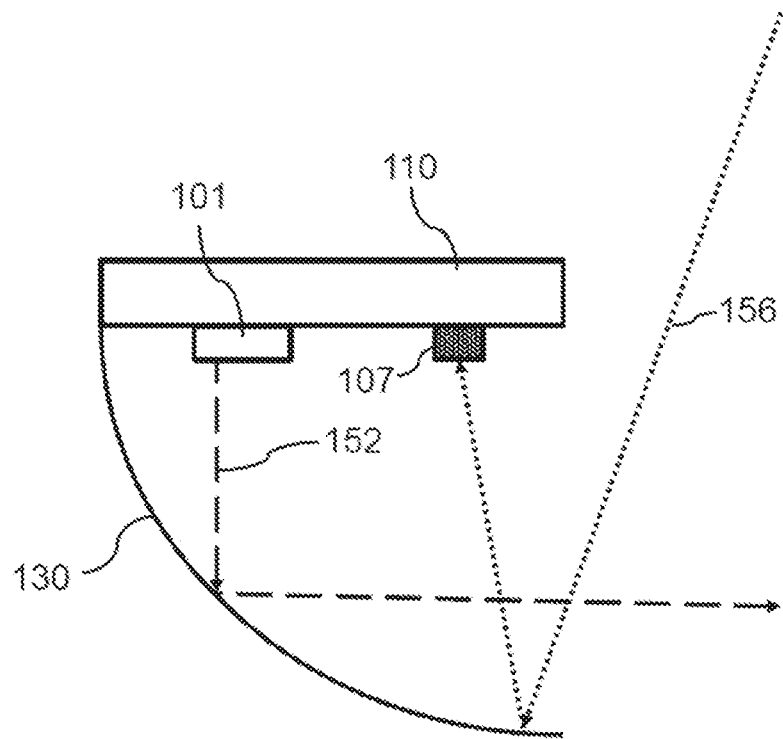
FIG. 7 shows a principal sketch of a cross-section of the relevant part of the third embodiment of the illuminant mounted in a reflector of the headlight.

FIG. 7 shows a principal sketch of a cross-section of the relevant part of the third embodiment of the illuminant 100 mounted in a reflector 130 of the headlight. The position of the ambient light detector 107 may be adapted to the type of reflector 130 of the vehicle headlight.

Figure 8:
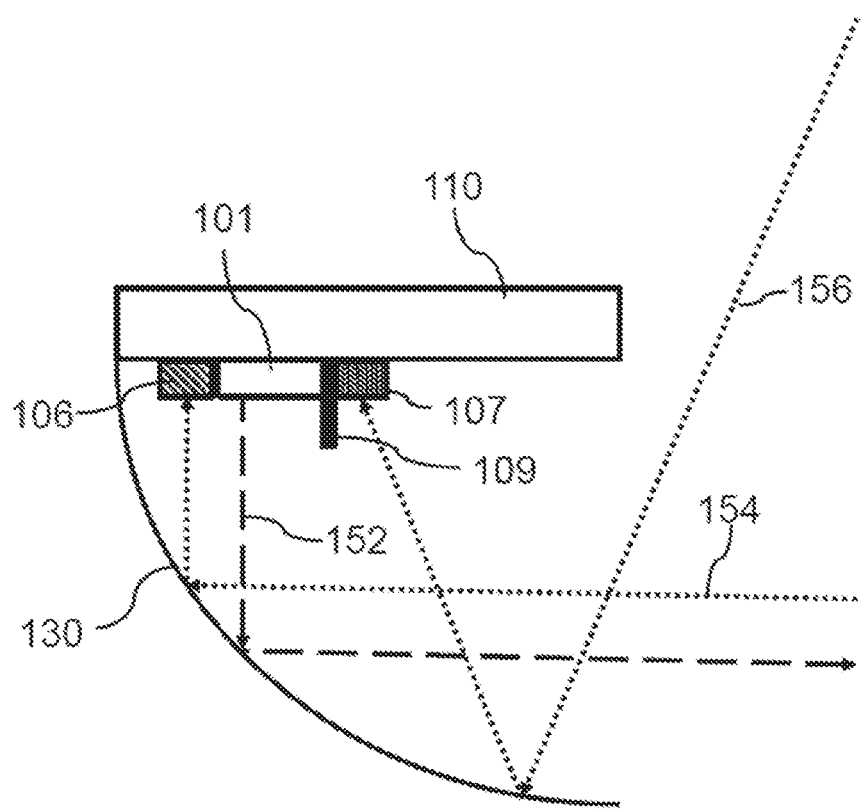
FIG. 8 shows a principal sketch of a cross-section of the relevant part of a fourth embodiment of the illuminant mounted in a reflector of the headlight.

FIG. 8 shows a principal sketch of a cross-section of the relevant part of a fourth embodiment of the illuminant 100 mounted in a reflector 130 of a headlight. The illuminant 100 comprises in this case a separate vehicle light detector 106 as discussed with respect to FIG. 4 and an ambient light detector 107. The illuminant 100 further comprises a vehicle light shield 109 which is arranged to shield and absorb vehicle light 154 such that essentially no vehicle light 154 is detected by the ambient light detector 107. The carrier 110 is further covered with a light absorbing coating in order to avoid or at least reduce multiple reflections of vehicle light 154.

Figure 9:
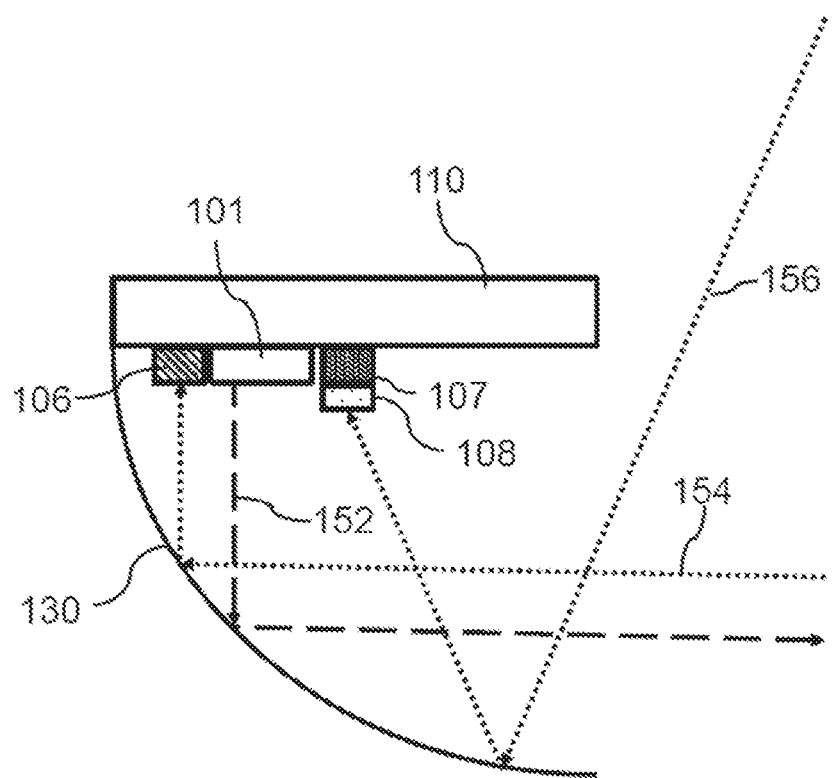
FIG. 9 shows a principal sketch of a cross-section of the relevant part of a fifth embodiment of the illuminant mounted in a reflector of the headlight.

FIG. 9 shows a principal sketch of a cross-section of the relevant part of a fifth embodiment of the illuminant 100 mounted in a reflector 130 of a headlight. The configuration is very similar as discussed with respect to FIG. 8. The vehicle light shield 109 is replaced by a vehicle light filter 108 which is arranged to absorb light within a predefined wavelength range which is predominantly emitted by vehicle headlights or vehicle rear lights. The illuminant 100 may comprise two, three, four or more ambient light detectors 107 with different types of vehicle light filters 108 in accordance with different types of headlights or rear lights and the corresponding emission spectrum.

The described measures to determine ambient light 156 may be combined in any suitable way in order to determine a reliable switching threshold for switching off or on the high-beam LEDs 101 or low-beam LEDs 103 in order to provide a suitable illumination mode.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 100 illuminant for automotive headlight
101 high-beam LED
103 low-beam LED
105 low-beam aperture
106 vehicle light detector
107 ambient light detector
108 vehicle light filter
109 vehicle light shield
110 carrier
112 mechanical interface
114 electrical connector
115 electrical driver
130 reflector
152 emitted light
154 vehicle light
156 ambient light
201 LED drive current
203 time
211 drive current for switching on the LEDs
213 drive current for switching off the LEDs

What is claimed is:

1. An illuminant for a vehicle headlight comprising:
a light detector on a carrier, the light detector configured to receive one or more of a vehicle light and an ambient light;
the light detector further configured to provide one or more light detection signals to an electrical driver based on the received one or more of vehicle light and ambient light; and
a high-beam light emitting diode (LED) and a low-beam LED on the carrier, one of the high-beam LED or the low-beam LED configured to receive a driving current from the electrical driver during a time period based on the one or more light detection signals,
wherein the high-beam LED and the low-beam LED are further configured to receive no driving current for a predefined time interval and the light detector is configured to provide the one or more light detection signals during the predefined time interval.

2. The illuminant of claim 1, further comprising:
a mechanical interface configured to mount the illuminant in a corresponding socket of the vehicle headlight in a detachable way.

3. The illuminant of claim 1, wherein the high-beam LED is configured to provide an illumination field and the light detector is configured to provide a detection field that at least partly overlaps the illumination field.

4. The illuminant of claim 1, wherein one or more of the high-beam LED and the low-beam LED are configured to act as the light detector in the predefined time interval.

5. The illuminant of claim 1, wherein the light detector comprises a vehicle light detector and a separate ambient light detector.

6. The illuminant of claim 5, wherein a detection field of the vehicle light detector does not overlap with a detection field of the ambient light detector.

7. The illuminant of claim 5, further comprising:
a vehicle light shield configured to shield the ambient light detector from vehicle light impinging on the ambient light detector directly or via a reflection by a reflector.

8. The illuminant of claim 5, further comprising:
a vehicle light filter configured to filter wavelength ranges corresponding to vehicle headlights or rear lights from impinging on the ambient light detector.

9. A system for use in a vehicle headlight, the system comprising:
a high-beam light emitting diode (LED) and a low-beam LED on a carrier;

a light detector on the carrier, the light detector configured to receive one or more of a vehicle light and an ambient light;
a mechanical interface configured to mount the illuminant in a corresponding socket of the vehicle headlight in a detachable way;
an electrical driver configured to receive one or more light detection signals from the light detector based on the received one or more of vehicle light and ambient light; and
the electrical driver further configured to provide one of the high-beam LED or the low-beam LED a driving current during a time period based on the one or more light detection signals,
wherein the electrical driver is further configured to provide no driving current to the high-beam LED and the low-beam LED for a predefined time interval and the light detector is configured to provide the one or more light detection signals during the predefined time interval.

10. The system of claim 9, wherein the high-beam LED is configured to provide an illumination field and the light detector is configured to provide a detection field that at least partly overlaps the illumination field.

11. The system of claim 9, wherein one or more of the high-beam LED and the low-beam LED are configured to act as the light detector in the predefined time interval.

12. The system of claim 9, wherein the light detector comprises a vehicle light detector and a separate ambient light detector.

13. The system of claim 12, wherein a detection field of the vehicle light detector does not overlap with a detection field of the ambient light detector.

14. The system of claim 9, further comprising:
a vehicle light shield configured to shield the ambient light detector from vehicle light impinging on the ambient light detector directly or via a reflection by a reflector.

15. The system of claim 9, further comprising:
a vehicle light filter configured to filter wavelength ranges corresponding to vehicle headlights or rear lights from impinging on the ambient light detector.

16. The system of claim 9, wherein the electrical driver is further configured to:
synchronize receiving the one or more light detection signals with a switching state of another illuminant in another headlight of the vehicle;
calculate a difference between the one or more light detection signals received when the other illuminant is switched on and the one or more light detection signals received when the other illuminant is switched off; and
provide the driving current to only the low-beam LED if the difference is above a predetermined level.

17. A method for use in a vehicle headlight, the method comprising:
receiving, by a light detector on a carrier, one or more of a vehicle light and an ambient light;
receiving, by an electrical driver, one or more light detection signals from the light detector based on the received one or more of vehicle light and ambient light; and
providing, by the electrical driver, a driving current to one of a high-beam light emitting diode (LED) or a low-beam LED on the carrier during a time period based on the one or more light detection signals,
wherein the electrical driver is further configured to provide no driving current to the high-beam LED and the low-beam LED for a predefined time interval and the light detector is configured to provide the one or more light detection signals during the predefined time interval.

18. The method of claim 17, wherein the light detector comprises a vehicle light detector and a separate ambient light detector.

* * * * *